(12) United States Patent
Durse et al.

(10) Patent No.: US 12,355,166 B2
(45) Date of Patent: Jul. 8, 2025

(54) BUS BAR ASSEMBLY

(71) Applicant: Aptiv Technologies AG, Schaffhausen (CH)

(72) Inventors: Nicholas A. Durse, Youngstown, OH (US); Adam Wolfgang, Petersburg, OH (US); Patrick J. Reedy, Youngstown, OH (US)

(73) Assignee: Aptiv Technologies AG, Schaffhausen (CH)

( * ) Notice: Subject to any disclaimer, the term of this patent is extended or adjusted under 35 U.S.C. 154(b) by 331 days.

(21) Appl. No.: 17/849,800

(22) Filed: Jun. 27, 2022

(65) Prior Publication Data

US 2022/0328987 A1    Oct. 13, 2022

Related U.S. Application Data

(62) Division of application No. 16/865,316, filed on May 2, 2020, now Pat. No. 11,404,804.
(Continued)

(51) Int. Cl.
*H01M 50/55* (2021.01)
*H01B 17/16* (2006.01)
(Continued)

(52) U.S. Cl.
CPC ............. *H01R 11/09* (2013.01); *H01B 17/16* (2013.01); *H01B 17/66* (2013.01); *H01M 10/425* (2013.01); *H01M 50/505* (2021.01); *H01M 50/55* (2021.01); *H01M 2220/20* (2013.01); *H01R 4/308* (2013.01); *H01R 13/506* (2013.01)

(58) Field of Classification Search
CPC .. H01M 10/425; H01M 50/505; H01M 50/55; H01M 2220/20
See application file for complete search history.

(56) References Cited

U.S. PATENT DOCUMENTS 5,576,516 A    11/1996  Kameyama et al.
9,054,359 B2    6/2015  Han et al.
(Continued)

FOREIGN PATENT DOCUMENTS

CN    1157494 A    8/1997
CN    104137297 A    11/2014
(Continued)

OTHER PUBLICATIONS

English Abstract Translation for DE102010024519, published Dec. 22, 2011.
(Continued)

*Primary Examiner* — Nicholas A Smith
*Assistant Examiner* — Ziheng Lu
(74) *Attorney, Agent, or Firm* — Billion & Armitage

(57) ABSTRACT

A bus bar assembly includes a nonconductive terminal cap that is configured to secure to an electrically conductive terminal via an attachment feature. The terminal cap has a slot that is configured to expose a terminal portion of the terminal when in an assembled condition. A bus bar has an end that is configured to be received in and extend through the slot when in the assembled condition in which the end is in electrical contact with the terminal portion of the terminal. A nonconductive shroud encloses the bus bar.

11 Claims, 9 Drawing Sheets

Related U.S. Application Data

(60) Provisional application No. 62/865,470, filed on Jun. 24, 2019.

(51) Int. Cl.
*H01B 17/66* (2006.01)
*H01M 10/42* (2006.01)
*H01M 50/505* (2021.01)
*H01R 11/09* (2006.01)
*H01R 4/30* (2006.01)
*H01R 13/506* (2006.01)

(56) References Cited

U.S. PATENT DOCUMENTS

| | | |
|---|---|---|
| 9,350,127 B2 | 5/2016 | Callicoat et al. |
| 9,431,811 B2 | 8/2016 | Takishita et al. |
| 9,437,860 B2 | 9/2016 | Farha |
| 9,508,464 B2 | 11/2016 | Nakayama |
| 9,787,020 B2 | 10/2017 | Choi et al. |
| 9,997,758 B2 | 6/2018 | Kim et al. |
| 10,256,451 B2 | 4/2019 | Kim |
| 10,396,405 B2 | 8/2019 | Zhao |
| 2002/0134572 A1 | 9/2002 | Matsumura |
| 2003/0059676 A1* | 3/2003 | Ruiz Rodriguez . H01M 50/278 429/72 |
| 2006/0270277 A1 | 11/2006 | Zhao et al. |
| 2009/0317695 A1* | 12/2009 | Wood ................. H01M 10/425 429/90 |
| 2014/0205888 A1* | 7/2014 | Kim ..................... H01M 50/51 429/158 |
| 2017/0244076 A1* | 8/2017 | Yuasa ................... H01G 11/82 |

FOREIGN PATENT DOCUMENTS

| | | |
|---|---|---|
| DE | 102010024519 A1 | 12/2011 |
| EP | 0765005 A2 | 3/1997 |
| KR | 100821859 B1 | 4/2008 |

OTHER PUBLICATIONS

English Abstract Translation for KR100821859, published Apr. 5, 2008.
Extended European Search Report for EP Application No. 20181662.6, dated Oct. 5, 2020, 9 pages.
"Non-Final Office Action for Application No. 202010586768.7"; China National Intellectual Property Administration; mailed on Dec. 12, 2024; 17 Pages.

* cited by examiner

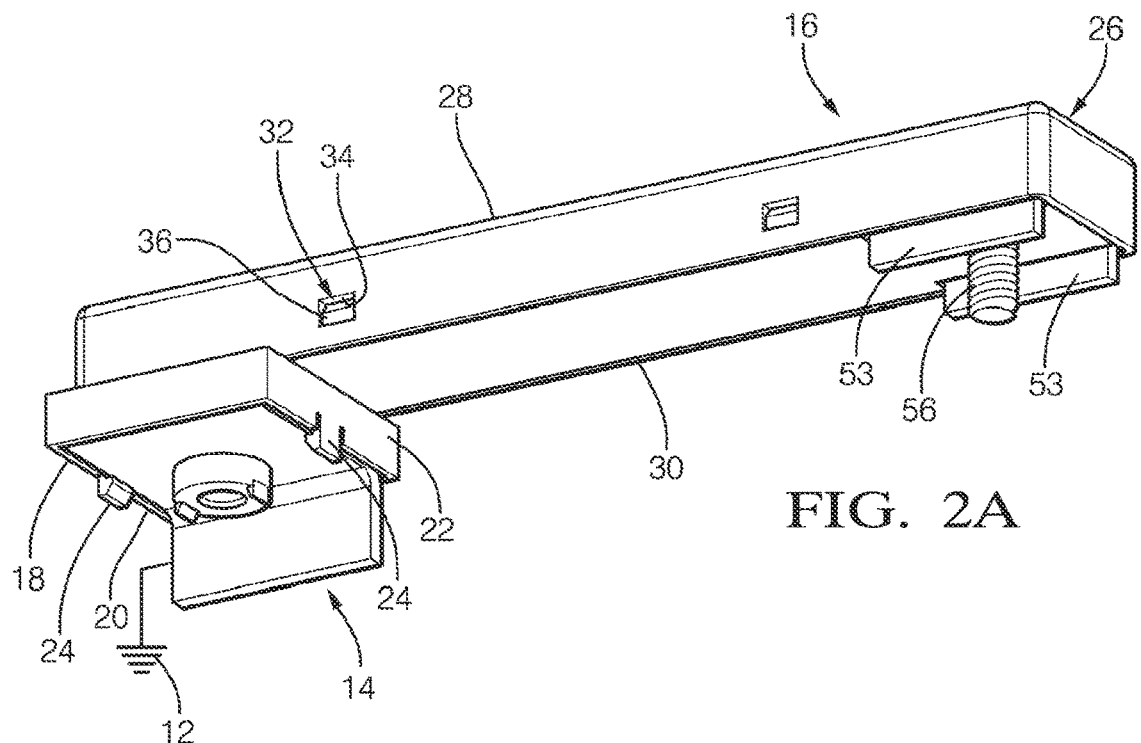
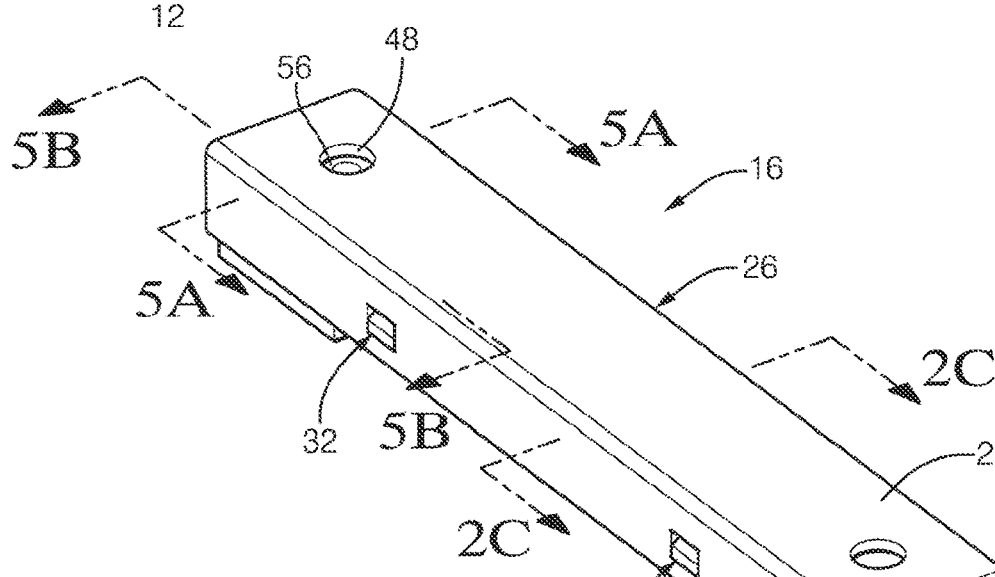
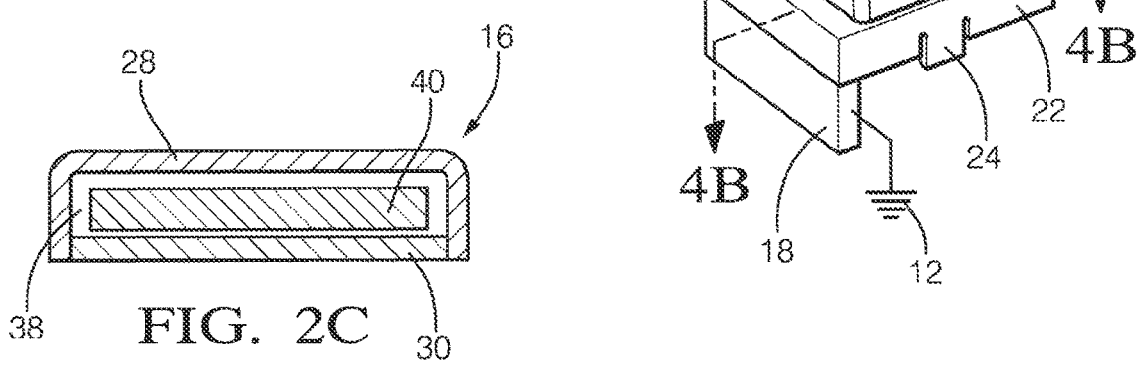

BUS BAR ASSEMBLY

CROSS-REFERENCE TO RELATED APPLICATION

This application is a divisional application of U.S. patent application Ser. No. 16/865,316 filed on May 2, 2020, which claimed the benefit of U.S. Provisional Patent Application No. 62/865,470 filed on Jun. 24, 2019, the entire disclosure of each of which is hereby incorporated by reference.

FIELD OF INVENTION

The disclosure relates to a bus bar used to connect battery cells, for example.

BACKGROUND

A battery module has multiple battery cells with terminals that are electrically connected to one another to provide a more powerful battery than the individual cells would otherwise provide. One common type of electrical connection is a cable having terminal rings at opposing ends. Each terminal ring is bolted to one of terminals of one of the cells. Another common type of electrical connection is a bus bar that is bolted to the cells in a similar manner to that of the cable.

The type of battery module used in, for example, automotive applications provides significant electrical energy. It is desirable to design a system for electrically connecting and disconnecting the cells in a manner that is safe for the battery module assembly and/or service technicians.

SUMMARY

In one exemplary embodiment, a bus bar assembly includes, among other things, a nonconductive terminal cap that is configured to secure to an electrically conductive terminal via an attachment feature. The terminal cap has a slot that is configured to expose a terminal portion of the terminal in an assembled condition. A bus bar has an end that is configured to be received in the slot in the assembled condition in which the end is in electrical contact with the terminal portion of the terminal. A nonconductive shroud encloses the bus bar. The end extends through shroud.

In a further embodiment of any of the above, the attachment feature includes at least one snap that is configured to be secured to a perimeter of a terminal pad that is provided by the terminal.

In a further embodiment of any of the above, the assembly includes a bolt that extends through a first hole in the end of the bus bar and a second hole in the shroud. The terminal cap includes a third hole that is configured to be aligned with a threaded member of the terminal. The third hole is finger-proof, and the threaded member is configured to receive the bolt in the assembled condition.

In a further embodiment of any of the above, the shroud includes first and second shroud portions that are secured to one another about the bus bar. The second hole is provided in the second shroud portion. The first shroud portion includes an access hole that is finger-proof and is aligned with the bolt and configured to receive a tool that cooperates with a head of the bolt.

In a further embodiment of any of the above, the terminal cap includes a pair of the slot. The slot is finger-proof, and the end of the bus bar has a U-shape provided by legs. The legs are configured to be received in the slots and include a bolt that extends through the end and is configured to secure the bus bar to the terminal.

In a further embodiment of any of the above, the bolt is arranged between the legs.

In a further embodiment of any of the above, the slot is finger-proof and has a first arcuate hook-shape. The terminal cap includes a post that is interiorly arranged with respect to the slot. The end of the bus bar has a second arcuate hook-shape that is configured to be received in the slot and surround the post in the assembled condition and includes a bolt that extends through the end of the bus bar and is configured to secure the bus bar to the terminal.

In a further embodiment of any of the above, the bolt is configured to be received in the post in the assembled condition.

In another exemplary embodiment, a battery module includes, among other things, a battery cell has a terminal that is provided by a terminal pad with a threaded member. A nonconductive terminal cap is secured to the terminal via an attachment feature. The terminal cap has a slot that exposes a terminal portion of the terminal pad in an assembled condition. A bus bar has an end that is received in the slot in the assembled condition in which the end is in electrical contact with the terminal pad. A nonconductive shroud encloses the bus bar. The end extends through shroud. A bolt has first and second bolt portions. The first bolt portion is contained within the shroud. The second bolt portion is secured to the threaded member to clamp the end of the bus bar into engagement with the terminal pad.

In a further embodiment of any of the above, the battery cell is a first battery cell, and includes a second battery cell. The end is a first end, and the bus bar has a second end. The bolt is a first bolt and includes a second bolt that secures the second end to the second battery cell.

In a further embodiment of any of the above, the terminal cap encloses the terminal pad except where the slot is finger-proof and exposes the terminal portion. A hole in the terminal cap exposes the threaded member. The hole is finger-proof.

In a further embodiment of any of the above, the attachment feature includes at least one snap that is secured to a perimeter of the terminal pad.

In a further embodiment of any of the above, the bolt extends through a first hole in the end of the bus bar and a second hole in the shroud. The terminal cap includes a third hole that corresponds to the hole.

In a further embodiment of any of the above, the shroud includes first and second shroud portions that are secured to one another about the bus bar. The second hole is provided in the second shroud portion. The first shroud portion includes an access hole that is finger-proof and is aligned with the first bolt portion and configured to receive a tool that cooperates with a head of the first bolt portion.

In a further embodiment of any of the above, the terminal cap includes a pair of the slot. The slot is finger-proof, and the end of the bus bar has a U-shape that is provided by legs. The legs are configured to be received in the slots, the bolt extends through the end and is configured to secure the bus bar to the terminal. The bolt is arranged between the legs.

In a further embodiment of any of the above, the slot is finger-proof and has a first arcuate hook-shape. The terminal cap includes a post that is interiorly arranged with respect to the slot. The end of the bus bar has a second arcuate hook-shape that is configured to be received in the slot and surround the post in the assembled condition. The bolt is received in the post in the assembled condition.

In another exemplary embodiment, a method of electrically connecting cells of a battery includes, among other things, securing a nonconductive terminal cap over a conductive battery cell terminal. The terminal cap includes a hole and a slot that expose a terminal portion of the terminal. A bus bar assembly is provided with a bus bar having an end, a nonconductive shroud that encloses the bus bar with the end that extends through a shroud. A bolt is captured in the end by the shroud. The end is located in the slot. The bolt is secured to the terminal through the hole to clamp the end into engagement with the terminal.

In a further embodiment of any of the above, the securing step includes snapping the terminal cap to a perimeter of the terminal.

In a further embodiment of any of the above, the terminal cap includes a pair of the slot. The slot is finger-proof, and the end of the bus bar has a U-shape that is provided by legs. The locating step b) includes positioning the legs in the slots. The bolt extends through the end between the legs.

In a further embodiment of any of the above, the slot is finger-proof and has a first arcuate hook-shape. The terminal cap includes a post that is interiorly arranged with respect to the slot. The end of the bus bar has a second arcuate hook-shape. The locating step includes surrounding the post with the end, and the bolt is received in the post.

In a further embodiment of any of the above, the securing step c) includes inserting a tool through an access hole in the shroud to engage a head of the bolt and rotating the bolt with the tool. The access hole is finger-proof.

BRIEF DESCRIPTION OF THE DRAWINGS

The disclosure can be further understood by reference to the following detailed description when considered in connection with the accompanying drawings wherein:

FIGS. 2A and 2B are first and second perspective views of a first bus bar assembly.

FIG. 2C is a cross-sectional view of the first bus bar assembly taken along line 2C-2C in FIG. 2B.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
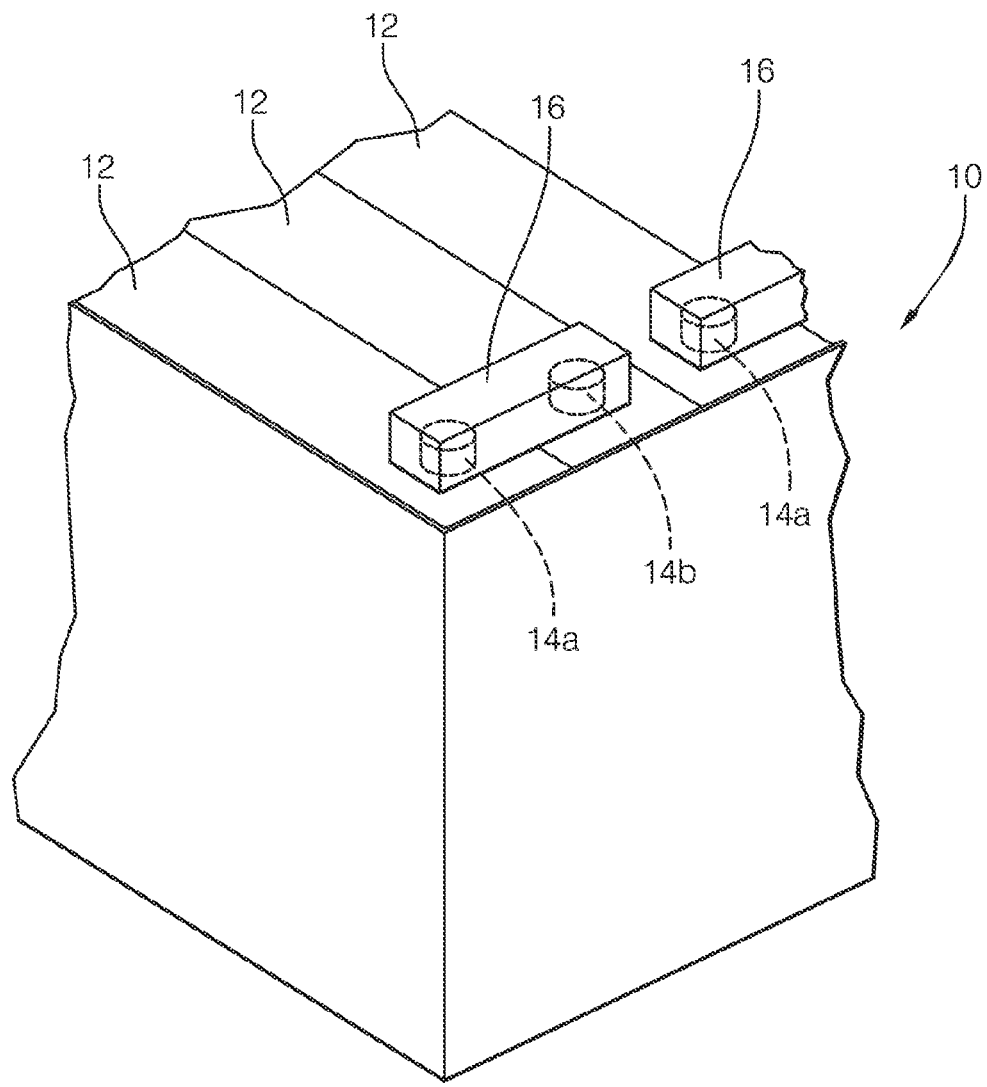
FIG. 1 is schematic of a battery module having multiple battery cells electrically connected to one another with bus bars.

A battery module 10, or battery pack assembly, is schematically illustrated in FIG. 1. The battery module 10 includes multiple battery cells 12 with positive and negative electrical terminals 14a, 14b (generally referred to as "terminal 14"). The terminals 14 of the various cells 12 are electrically connected to one another with bus bar assemblies 16 in a configuration that provides sufficient power for large electrical loads, such as automotive hybrid propulsion systems.

Figure 3:
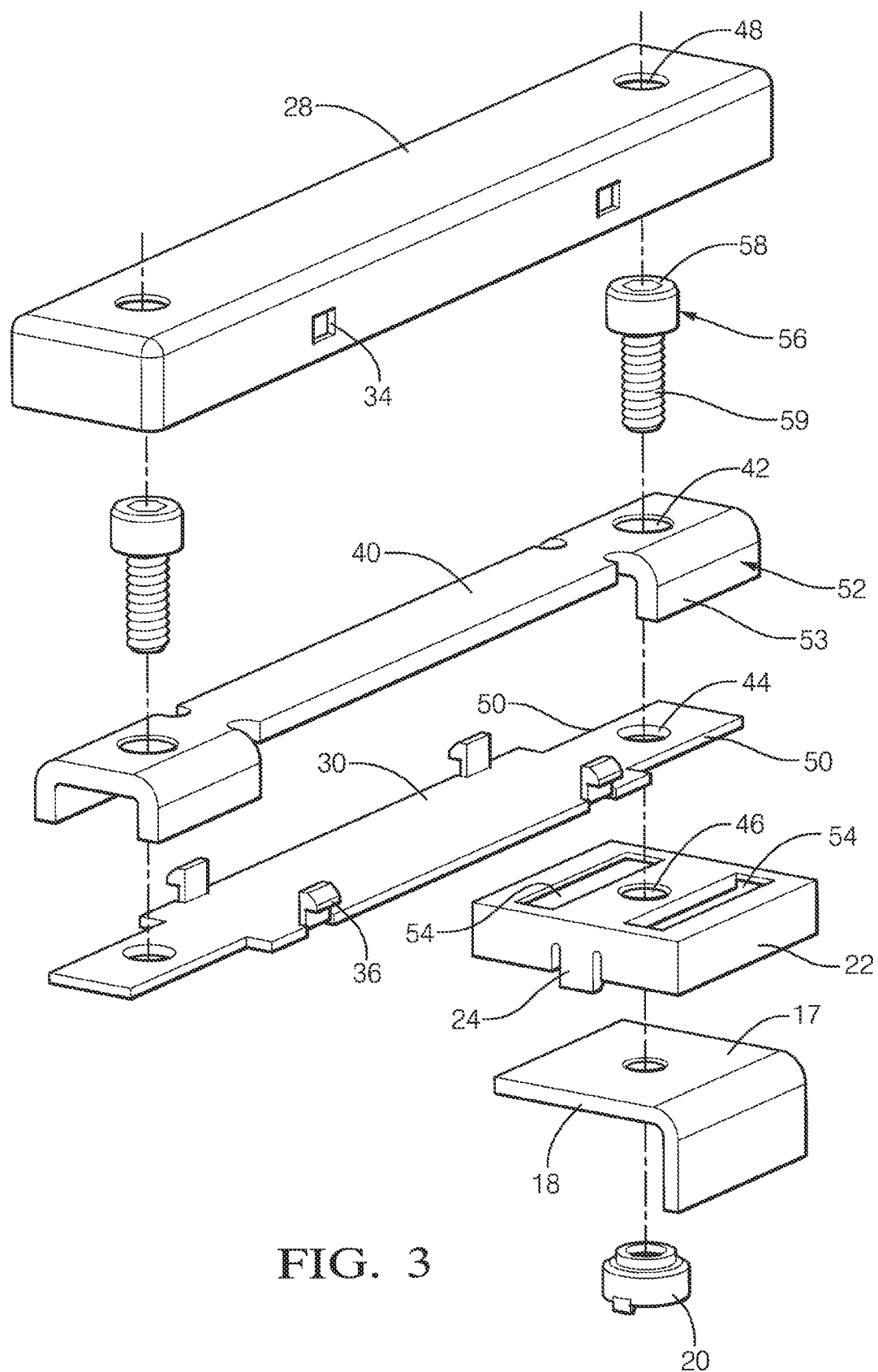
FIG. 3 is an exploded partial view of the first bus bar assembly.
Figure 4A:
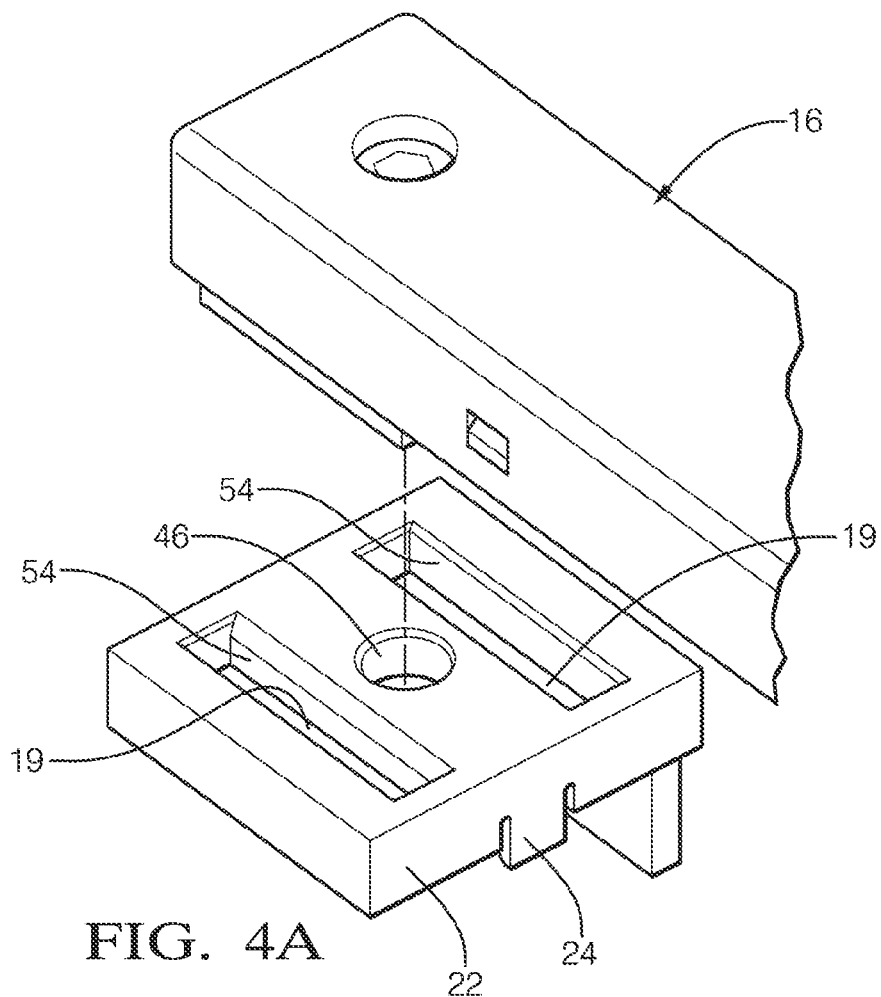
FIG. 4A is a partial view of the first bus bar assembly in an unassembled condition with respect to a terminal.
Figure 4B:
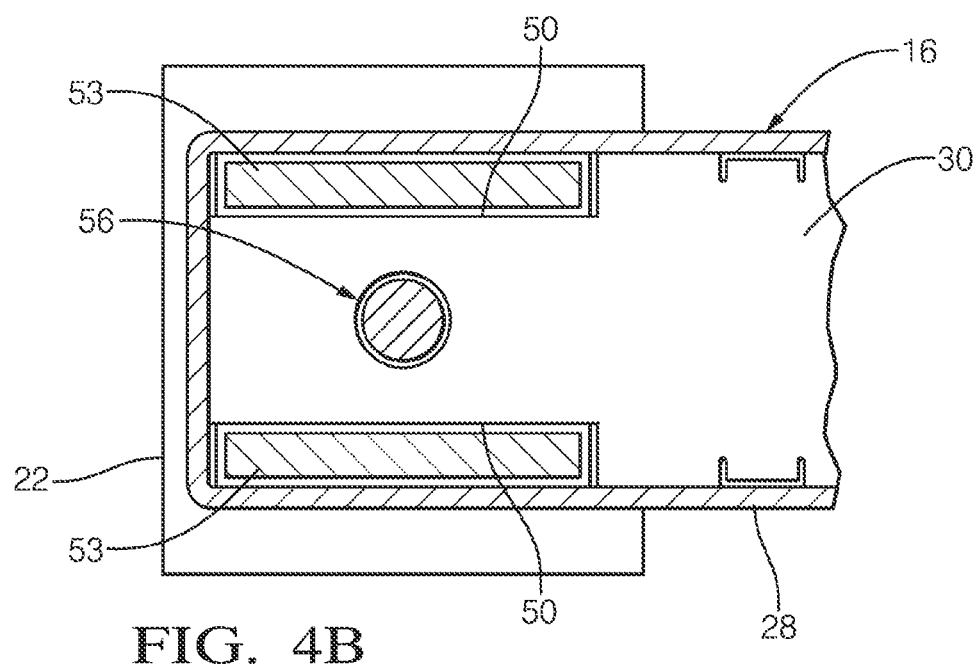
FIG. 4B is cross-sectional view of the first bus bar assembly taken along line 4B-4B in FIG. 2B.
Figure 5A:
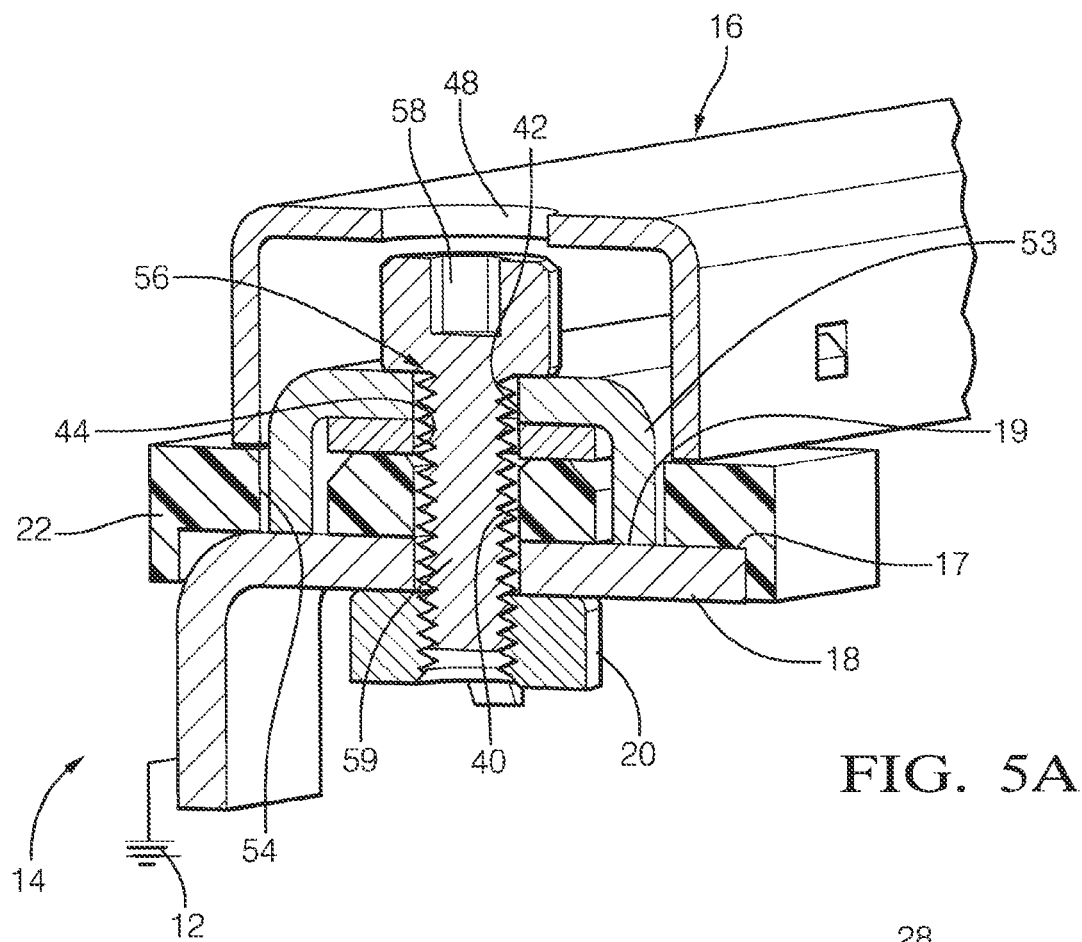
FIG. 5A is cross-sectional view of the first bus bar assembly taken along line 5A-5A in FIG. 2B with the first bus bar assembly connected to the terminal.
Figure 5B:
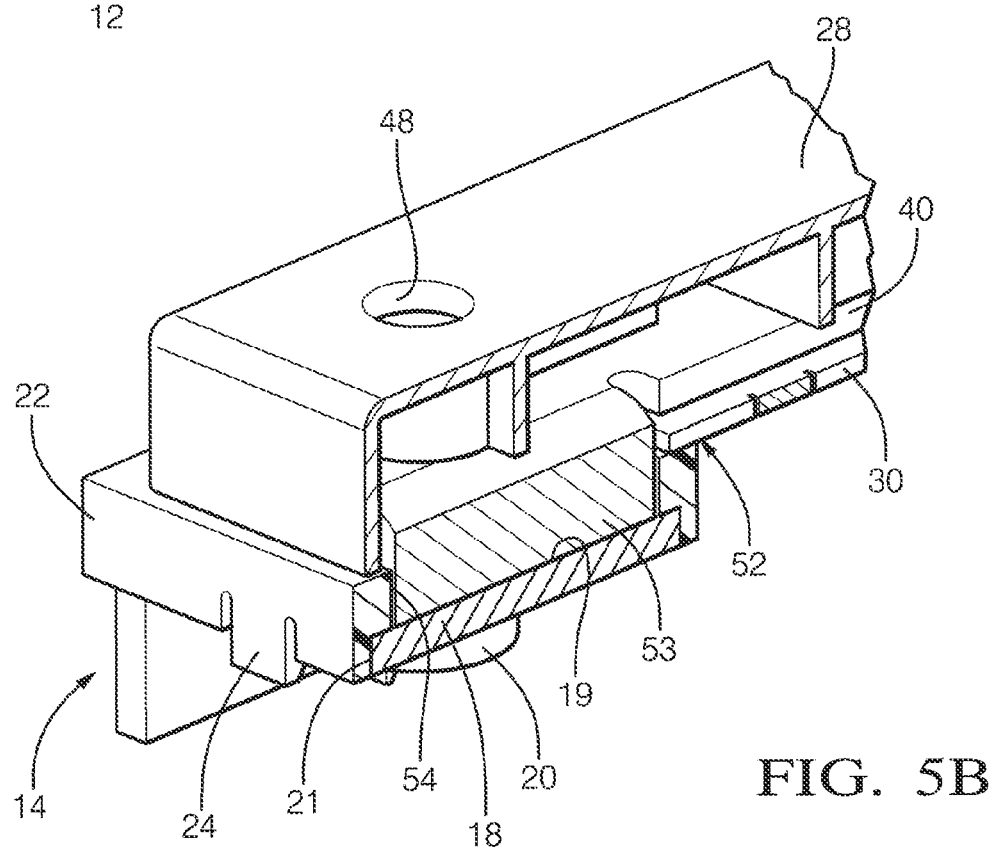
FIG. 5B is cross-sectional view of the first bus bar assembly taken along line 5B-5B in FIG. 2B with the first bus bar assembly connected to a terminal.
Figure 6A:
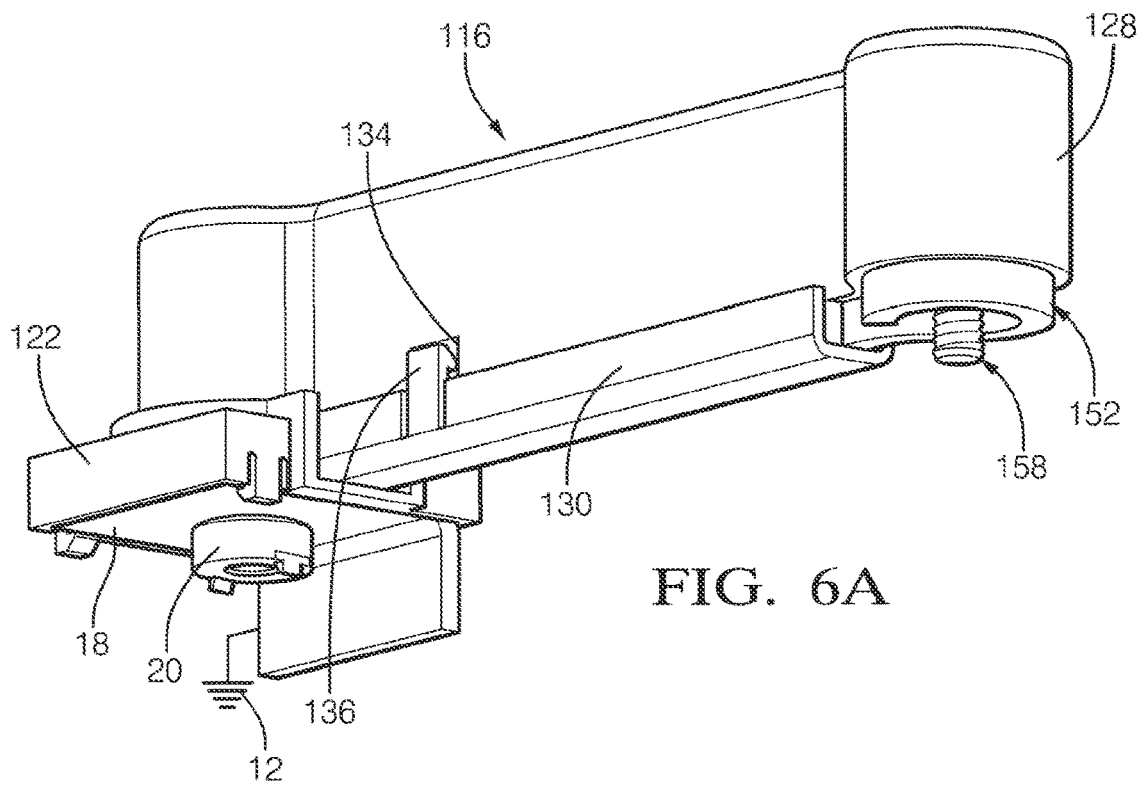
FIGS. 6A and 6B are first and second perspective views of a second bus bar assembly.
Figure 6B:
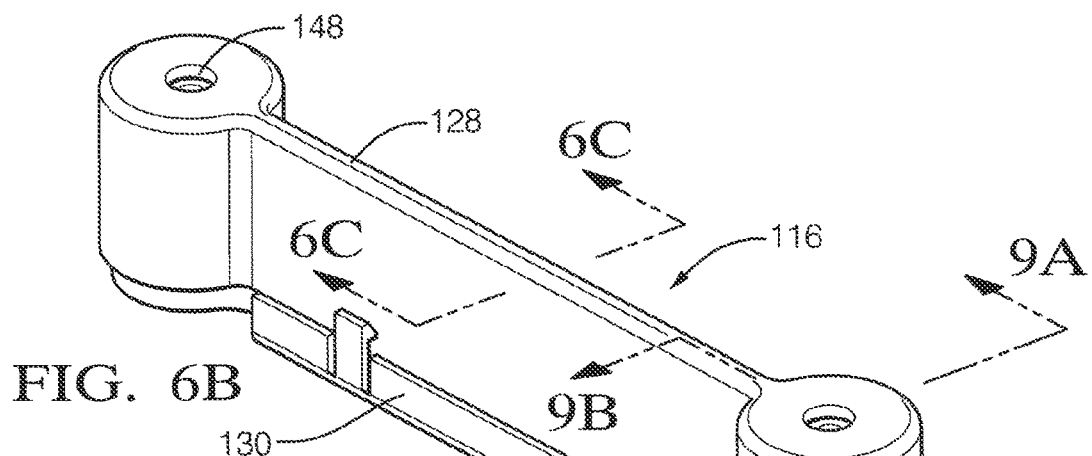
Figure 6C:
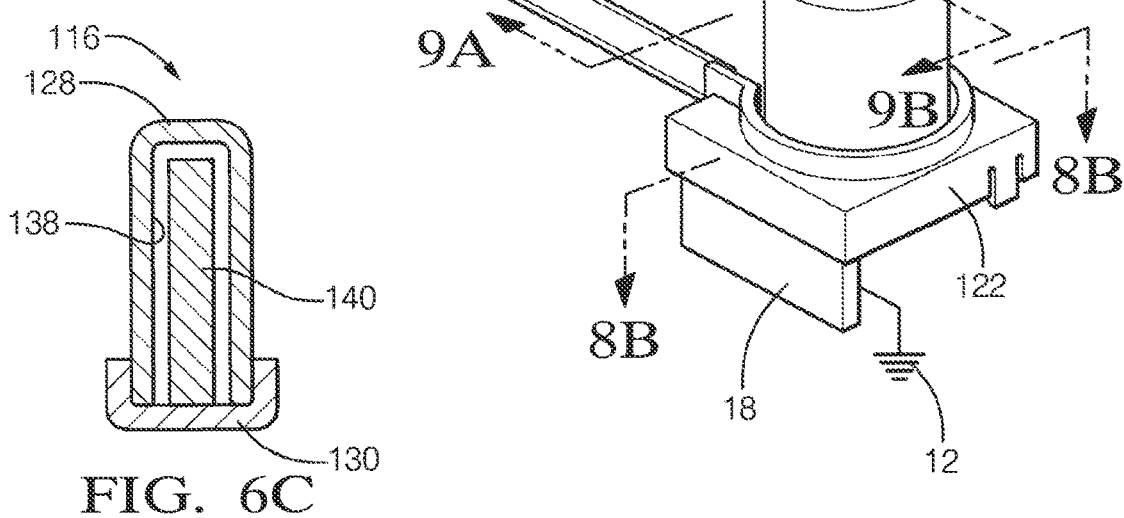
FIG. 6C is a cross-sectional view of the second bus bar assembly taken along line 6C-6C in FIG. 6B.
Figure 7:
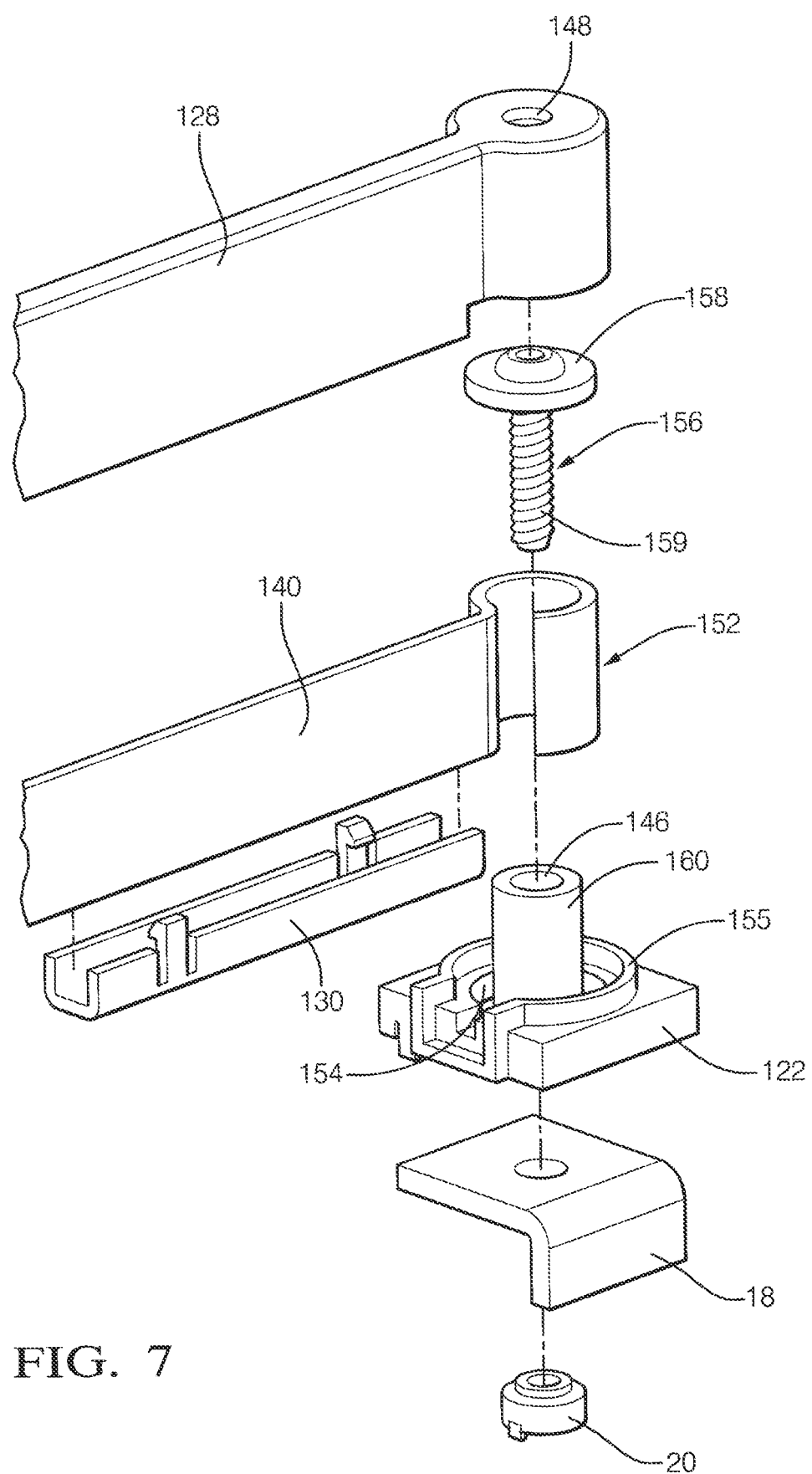
FIG. 7 is an exploded partial view of the first bus bar assembly.
Figure 8A:
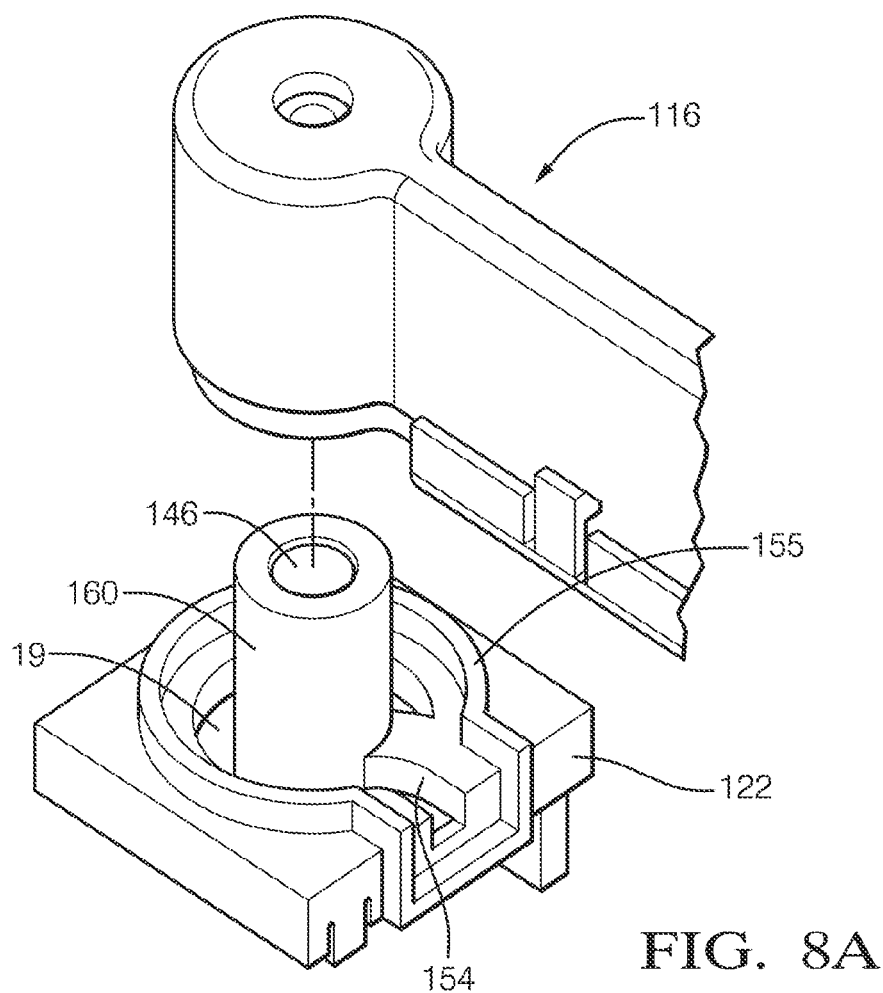
FIG. 8A is a partial view of the second bus bar assembly in an unassembled condition with respect to a terminal.
Figure 8B:
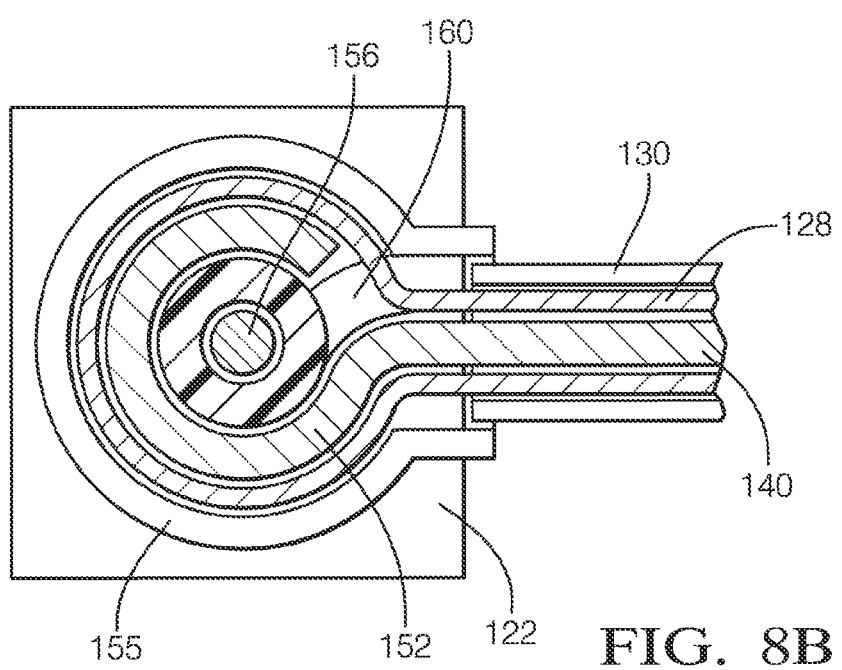
FIG. 8B is cross-sectional view of the second bus bar assembly taken along line 8B-8B in FIG. 6B.
Figure 9A:
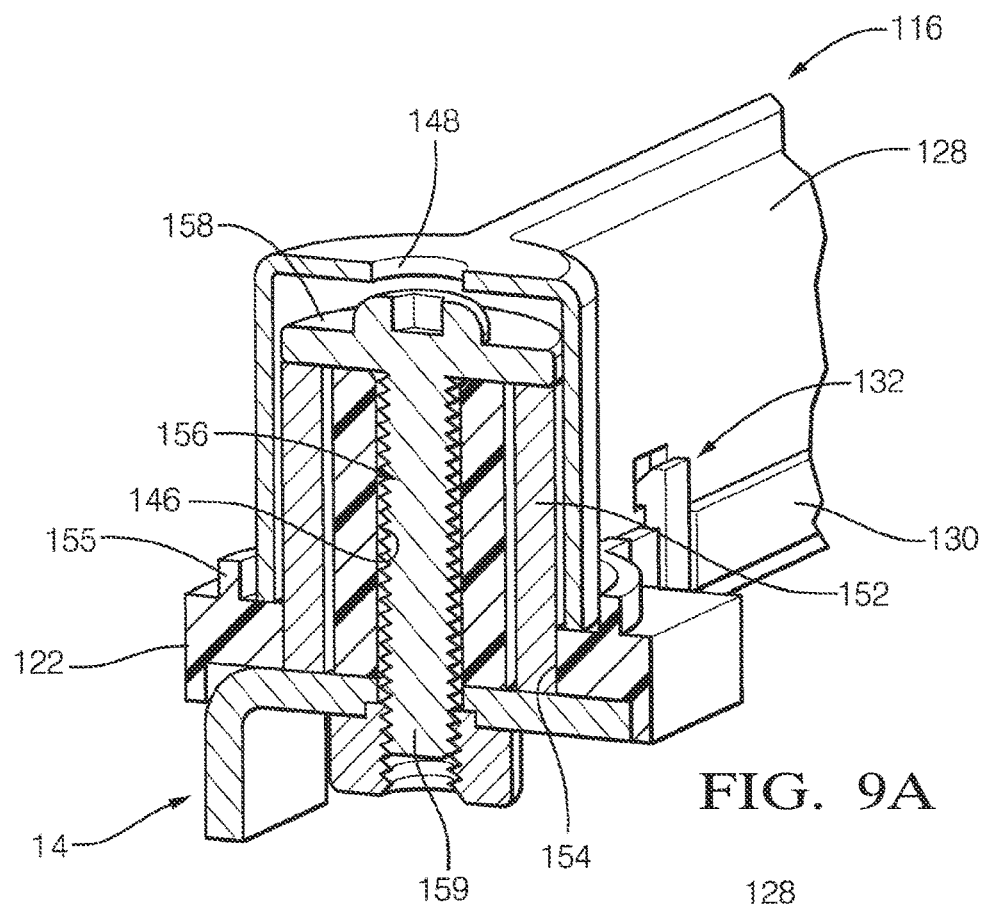
FIG. 9A is cross-sectional view of the second bus bar assembly taken along line 9A-9A in FIG. 6B with the second bus bar assembly connected to the terminal.
Figure 9B:
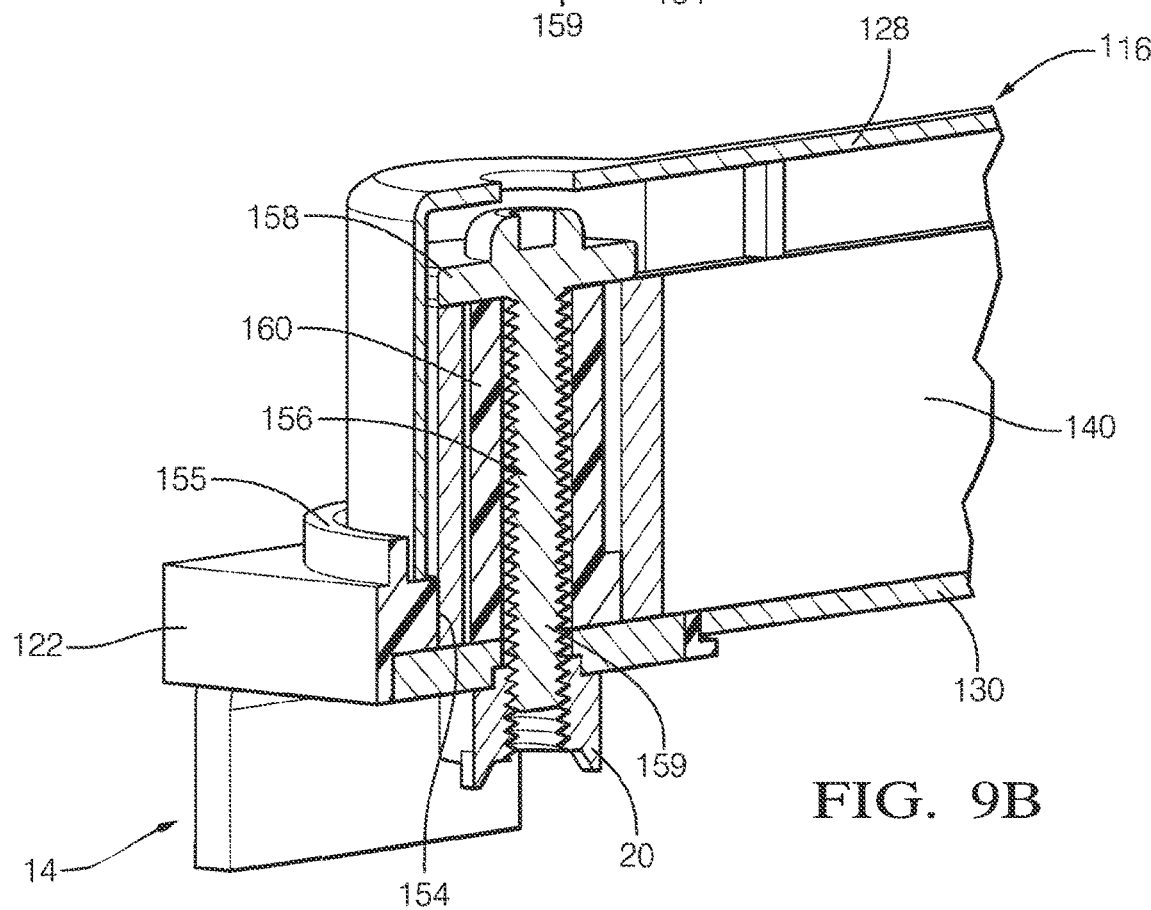
FIG. 9B is cross-sectional view of the second bus bar assembly taken along line 9B-9B in FIG. 6B with the second bus bar assembly connected to a terminal.

Referring to FIGS. 2A and 3, the terminal 14 is provided by a terminal pad 18 having a threaded member 20. In the example, the terminal pad 18 is an L-shaped copper structure, which provides a quadrangular outer surface 17 (FIG. 3) to which the bus bar assembly 16 is secured. Other terminal pad shapes may be used. The vertical portion (as depicted in the Figs.) of the terminal pad 18 is arranged within the protective nonconductive housing of the cell 12 and is not shown for simplicity.

There is a potential shock hazard when the outer surface 17 of the terminal 14 is left exposed. To mitigate the shock hazard when connecting and disconnecting the bus bar assembly 16 from the cells 12, a nonconductive terminal cap 22 is secured to the terminal 14 via an attachment feature 24, for example, snaps. In the example, the snaps engage a perimeter 21 of the terminal pad 18 to retain the terminal cap 22 over the terminal 14. The perimeter 21 is arranged within and enclosed by the terminal cap 22, as best shown in FIG. 2A.

The terminal cap 22 has a finger-proof slot 54 exposing a terminal portion 19 of the terminal pad 18 in an assembled condition, that is, with the terminal cap 22 secured to the terminal 14. In this disclosure, "finger-proof" means a configuration that meets the standard set forth in IEC 60529 entitled "Degrees of Protection Provided by Enclosures" and code IP2XB relating to finger Ingress Protection. The "test finger" is based upon a solid object 12.5 mm in diameter or more and up to 80 mm long being prevented from entering an enclosure. Furthermore, if a standard test finger 80 mm long and 12 mm in diameter enters the enclosure there will be adequate clearance from live parts, i.e., the terminal. In this manner, the disclosed finger-proof terminal cap 22 prevents a technician from inadvertently touching the terminal 14 with the terminal cap 22 in place, for example, during assembly and/or removal of the bus bar assembly 16 with respect to the cells 12. The terminal cap 22 can be a loose piece that is permanently attached to the terminals 14.

An example bus bar assembly 16 is shown in FIGS. 2A-5B. The bus bar assembly 16 includes a bus bar 40 that is substantially enclosed by a nonconductive shroud 26 within a cavity 38. The shroud 26 includes first and second shroud portions 28, 30 secured about the bus bar 40. In the example illustrated, attachments 32 between the first and second shroud portions 28, 30 are provided by snaps 36 removably received in corresponding windows 34. Other attachments may be used if desired.

The bus bar 40 includes an end 52 that extends through a notch 50 provided at an end of the second shroud portion 30 to expose a small portion of the end 52. One such end 52 is provided at each of opposing ends of the bus bar assembly 16. The end 52 is sized to be received in the slot 54 in the assembled condition in which the end 52 is in electrical contact with the terminal pad 18. The complementary shapes of the end 52 and the slot 54 assist in easily locating the bus bar assembly 16 relative to the cells 12 during assembly.

A bolt 56 extends through a first hole 42 in the end 52 of the bus bar 40 and a second hole 44 in the second shroud portion 30. The terminal cap 22 includes a third hole 46 configured to be aligned with the threaded member 20 when the terminal cap 22 is installed over the terminal pad 18. The bolt 56 has first and second bolt portions 58, 59. An access hole 48 is aligned with a head of the bolt 56 provided on the first bolt portion 58. A tool, such as an ALLEN or TORX wrench for example, can be inserted through the access hole 48 to engage the bolt head. The second bolt portion 59 has threads that cooperate with the threaded member 20 to clamp the end 52 tightly to the terminal 14 when the bolt 56 is torqued to specification to make a good electrical connection.

When the bus bar assembly 16 is in an assembled condition, the shroud 26 and the terminal cap 22 cooperate to enclose the end 52 so that no portion of the bus bar 40 is left exposed. But, with the bus bar assembly 16 removed, the slot 54 and third hole 46 only exposes only very small terminal portions 19, which are finger-proof and not susceptible to touching by the technician.

Various bus bar assembly and terminal cap configurations can be used to provide finger-proofing. The example illustrated in FIGS. 2A-5B uses a pair of rectangular spaced apart slots 54. The end 52 of the bus bar 40 has a U-shape provided by legs 53. The legs 53 are received in the slots 54 and extend through the terminal cap 22 when in the assembled condition to make a mechanical and electrical connection. The bolt 56 extends through the end 52 and is arranged between the legs 53.

Another bus bar assembly 116 and terminal cap 122 configuration is shown in FIGS. 6A-9B. Like numerals are used to indicate like elements. The bus bar assembly 116 includes a bus bar 140 that is substantially enclosed by a nonconductive shroud 126 within a cavity 138. In this example, the bus bar 140 is oriented 90° compared to the bus bar 40. The shroud 126 includes first and second shroud portions 128, 130 secured about the bus bar 140. The first shroud portion 128 is nested within the second shroud portion 130. In the example illustrated, attachments 132 between the first and second shroud portions 128, 130 are provided by snaps 136 removably received in corresponding windows 134.

The bus bar 140 includes an end 152 that extends through and is exposed between the first and second shroud portions 128, 130, similar to the shroud 26, to expose a small portion of the end 152. One such end 152 is provided at each of opposing ends of the bus bar assembly 116. The end 152 is sized to be received in the slot 154 and extend through the terminal cap 122 in the assembled condition in which the end 152 is in electrical and mechanical contact with the terminal pad 18.

A bolt 156 extends through a first hole in the end 152 provided by its scroll-like shape. The bolt 156 extends through a second hole 144 in the second shroud portion 30. The terminal cap 122 includes a third hole 146 configured to be aligned with the threaded member 20 when the terminal cap 122 is installed over the terminal pad 18. The bolt 156 has first and second bolt portions 158, 159. An access hole 148, which is finger-proof, is aligned with a head of the bolt 156 provided on the first bolt portion 158. The second bolt portion 159 has threads that cooperate with the threaded member 20 to clamp the end 152 tightly to the terminal 14 when the bolt 156 is torqued to specification to make a good electrical connection.

With this configuration, the slot 154 has a first arcuate hook-shape, and the terminal cap 122 includes a cylindrical post 160 interiorly arranged with respect to the slot 154. The end 152 of the bus bar 140 has a correspondingly shaped second arcuate hook-shape that is received in the slot 154 and surrounds the post 160 in the assembled condition. The term "arcuate" includes cylindrical as well as partially cylindrical shapes. The bolt 156 is received in the post 160 in the assembled condition.

In operation, during assembly of the battery module 10, the nonconductive terminal cap is secured over each conductive terminal, for example, by snapping the terminal cap around the perimeter of the terminal. The terminal cap includes the finger-proof hole and the finger-proof slot exposing a small terminal portion of the terminal. The nonconductive shroud encloses the bus bar with the end extending through shroud. With the bolt captured in the end by the shroud, the end is located in the slot and the bolt is disposed in the hole. The tool is inserted into the access hole in the shroud to engage the bolt, and the bolt is tightened to clamp the end into engagement with the terminal.

In this manner, the terminal cap can be permanently secured to the terminal, rendering the terminal finger-safe. Thus, the battery module is finger-proof even with the bus bar assemblies disconnected, which allows for safe assembly and handling of the battery module during assembly and servicing of the battery module.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

We claim:

1. A bus bar assembly comprising:
   a nonconductive terminal cap having an attachment feature configured to engage a perimeter of an electrically conductive terminal, thereby securing the terminal cap to the terminal and enclosing the terminal, the attachment feature includes at least one snap feature configured to secure the terminal cap to the perimeter of a planar terminal pad of the terminal;

a bus bar having an end configured to be received through a slot in the terminal cap such that the end is in electrical contact with the terminal; and a nonconductive shroud enclosing the bus bar, wherein the end of the bus bar extends through the shroud.

2. The bus bar assembly of claim 1, further comprising a bolt extending through a first hole in the end of the bus bar and a second hole in the shroud, wherein the terminal cap includes a third hole configured to be aligned with a threaded member of the terminal and wherein the threaded member is configured to receive the bolt when in the assembled condition.

3. The bus bar assembly of claim 2, wherein the shroud includes first and second shroud portions secured to one another about the bus bar, wherein the second hole is provided in the second shroud portion, and wherein the first shroud portion includes an access hole that is aligned with the bolt and is configured to receive a tool that cooperates with a head of the bolt.

4. The bus bar assembly of claim 1, wherein the slot is a first slot and wherein the terminal cap includes a second slot paired with the first slot, wherein the end of the bus bar has a U-shape provided by legs extending from the bus bar, wherein the legs are configured to be received in the first and second slots, and wherein the bus bar assembly further comprises a bolt extending through the end that is configured to secure the bus bar to the terminal.

5. The bus bar assembly of claim 4, wherein the bolt is arranged between the legs.

6. The bus bar assembly of claim 4, wherein the first and second slots have a rectangular shape.

7. The bus bar assembly of claim 4, wherein ends of the legs have a rectangular shape.

8. The bus bar assembly of claim 1, wherein the slot has a first arcuate hook-shape and the terminal cap includes a post interiorly arranged with respect to the slot and wherein the end of the bus bar has a second arcuate hook-shape configured to be received in the slot and surround the post when in the assembled condition and comprising a bolt extending through the end of the bus bar and configured to secure the bus bar to the terminal.

9. The bus bar assembly of claim 8, wherein the bolt is configured to be received in the post when in the assembled condition.

10. The bus bar assembly of claim 1, wherein the slot is sized, shaped, and arranged to prevent a solid object at least 12.5 millimeters in diameter and having a length of at least 80 millimeters from contacting the terminal.

11. The bus bar assembly of claim 10, wherein the slot is finger-proof per code IP2XB of IEC standard 60529.

* * * * *